Figure 1:
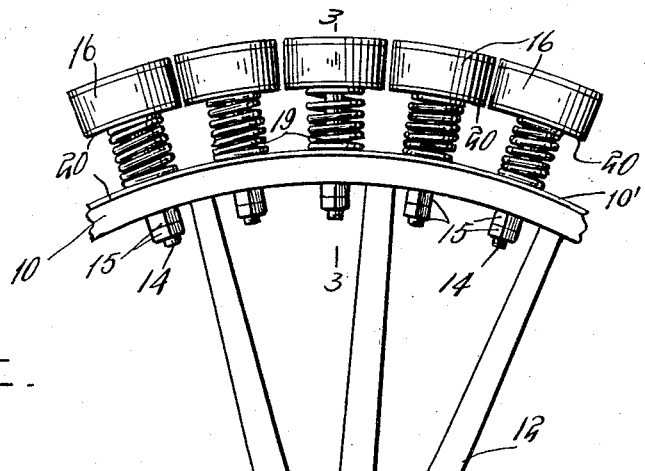

T. B. INGWERSEN.
WHEEL.
APPLICATION FILED SEPT. 8, 1915.

1,220,230. Patented Mar. 27, 1917.

Inventor
T. B. Ingwersen.

Witnesses

By

Attorneys

UNITED STATES PATENT OFFICE.

THOMAS B. INGWERSEN, OF BOWLING GREEN, MISSOURI.

WHEEL.

1,220,230.   Specification of Letters Patent.   Patented Mar. 27, 1917.

Application filed September 8, 1915. Serial No. 49,460.

*To all whom it may concern:*

Be it known that I, THOMAS B. INGWERSEN, a citizen of the United States, residing at Bowling Green, in the county of Pike, State of Missouri, have invented certain new and useful Improvements in Wheels; and I do hereby declare the following to be a full, clear, and exact description of the invention, such as will enable others skilled in the art to which its appertains to make and use the same.

This invention relates to improvements in wheels.

One object of the invention is to provide a simple and efficient device of this character which will be effective to support a vehicle so as to produce all of the advantages of a pneumatic tire without the annoying feature of puncturing possessed by pneumatic tires.

Another object is to provide a device of this character which will readily accommodate itself to the contour of the road without any bump or jar to the parts or to the vehicle.

Other objects and advantages will be apparent from the following description when taken in connection with the accompanying drawing.

Figure 2:
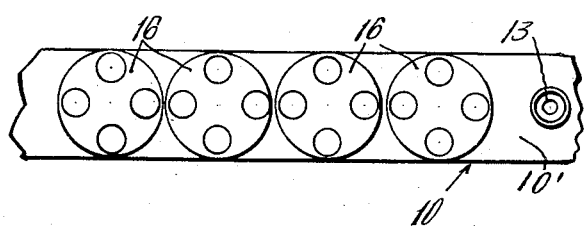
Figure 3:
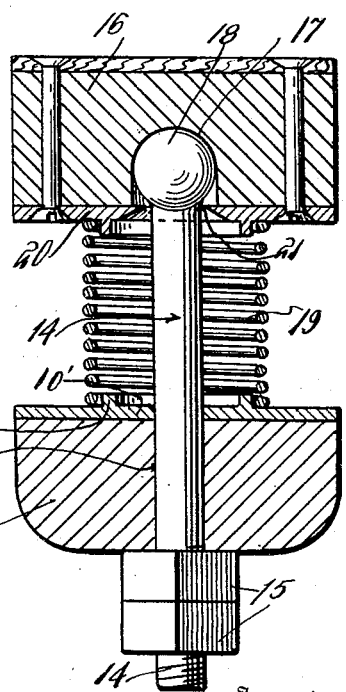

In the drawing:

Figure 1 is an elevation of a portion of a wheel made in accordance with my invention, Fig. 2 is a plan view, Fig. 3 is an enlarged vertical section on the line 3—3 of Fig. 1.

Referring particularly to the accompanying drawing, the wheel proper includes a rim 10, a hub 11, and the connecting spokes 12. On the rim is secured a metal band 10′ formed with a plurality of circular flanges 11′. Formed through the rim and band 10′ are a plurality of openings 13 through which are extended the bolts 14, the inner ends of which are provided with adjusting nuts 15 disposed inwardly of the rim. Connected to the outer end of each of the bolts is a tread plate 16, said plate having a socket member 17 for the reception of the ball head 18 of the bolt. These tread plates are preferably circular. Encircling each of the bolts and disposed between the rim and the disk or tread plate, is a coil spring 19 which normally holds the tread plate at the proper distance away from the rim.

Secured to the inner face of each of the tread plates 16 is a metal plate 20 which has a central opening 21 of a diameter smaller than the ball head 18 but slightly larger than the shank of the bolt. The surrounding wall of this opening is downwardly and outwardly flared to readily permit of the rocking movement of the tread plate on the bolt.

It will thus be seen that these bolts move inwardly and outwardly through the openings 13 as the wheel rotates, the springs immediately returning the tread plates to normal position when they have passed out of engagement with the ground. The fact that the tread plates are connected to the bolts by means of the ball and socket joints readily permits the said plates to rock longitudinally of the wheel and transversely thereof, thereby readily adapting themselves to the contour of the road surface. By means of the nuts 15 the tension of the springs can be regulated.

What is claimed is:

A resilient wheel including a rim having a band secured thereon and formed with a longitudinal series of radially extending openings, a bolt slidably disposed through each of the openings and each having a spherical head on the outer end thereof, a plurality of tread plates each having a recess in its inner face for the reception of the spherical head of one of the bolts, a second plate secured to the inner face of each of the tread plates and provided with a central opening through which the shank of a bolt passes, a coil spring surrounding the shank of each of the bolts and bearing against the band and said second plate, the wall of the opening of each of the said second plates being inclined inwardly toward the recess to readily permit of universal movement of the tread plate on the head of the bolt.

In testimony whereof, I affix my signature, in the presence of two witnesses.

THOMAS B. INGWERSEN.

Witnesses:
J. T. McCUNE,
C. E. PORTER.

Copies of this patent may be obtained for five cents each, by addressing the "Commissioner of Patents, Washington, D. C."